United States Patent [19]
Puthoff

[11] Patent Number: 5,845,220
[45] Date of Patent: Dec. 1, 1998

[54] COMMUNICATION METHOD AND APPARATUS WITH SIGNALS COMPRISING SCALAR AND VECTOR POTENTIALS WITHOUT ELECTROMAGNETIC FIELDS

[75] Inventor: Harold E. Puthoff, Austin, Tex.

[73] Assignee: EarthTech International, Inc., San Antonio, Tex.

[21] Appl. No.: 109,983

[22] Filed: Aug. 23, 1993

Related U.S. Application Data

[63] Continuation of Ser. No. 708,331, May 31, 1991, abandoned.

[51] Int. Cl.⁶ ..................................................... H04B 1/00
[52] U.S. Cl. ............................................................. 455/899
[58] Field of Search ..................................... 455/108, 899

[56] References Cited

PUBLICATIONS

Y. Aharonov et al., "Significance of Electromagnetic Potentials in the Quantum Theory," *The Physical Review*, 2nd Series, vol. 115, No. 3, Aug. 1, 1959, pp. 485–491.

Y. Aharonov et al., "Further Considerations on Electromagnetic Potentials in the Quantum Theory," *The Physical Review*, vol. 123, No. 4, Aug. 15, 1961, pp. 1511–1524.

Y. Imry et al., "Quantum Interference and the Aharonov–Bohm Effect," *Scientific American*, vol. 260, Apr. 1989, pp. 56–62.

R.P. Feynman et al., *The Feynman Lectures on Physics—Quantum Mechanics*, Addison–Wesley Publishing Company, pp. 21–14—21–18.

B.D. Josephson, "Coupled Superconductors," *Reviews of Modern Physics*, vol. 15, No. 7, 16 Aug. 1965, pp. 295–297.

D.N. Langenberg et al., "Investigation of Microwave Radiation Emitted by Josephson Junctions," *Physical Review Letters*, vol. 15, No. 7, 16 Aug. 1965, pp. 294–297.

R.C. Gelinas, *Curl–Free Vector Potential Effects in a Simply Connected Space*, 1986, Int'l Tesla Society, Inc., pp. 4–43—4–60.

*Primary Examiner*—Andrew Faile
*Attorney, Agent, or Firm*—Lowe Hauptman Gopstein Gilman & Berner

[57] ABSTRACT

Information that changes as a function of time is communicated from a transmitting site to a receiving site by transmitting a signal comprising scalar and vector potentials without including ay electromagnetic field. The potentials vary as a function of time in accordance with the information.

59 Claims, 3 Drawing Sheets

COMMUNICATION METHOD AND APPARATUS WITH SIGNALS COMPRISING SCALAR AND VECTOR POTENTIALS WITHOUT ELECTROMAGNETIC FIELDS

This application is a continuation of application Ser. No. 07/708,331 filed May 31, 1991 now abandoned.

FIELD OF THE INVENTION

The present invention relates generally to communication methods and apparatus and, more particularly, to a communication method and apparatus wherein information that changes as a function of time is transmitted by deriving a signal comprising scalar and vector potentials without including an electromagnetic field.

BACKGROUND ART

One of the most common methods of communicating information from one site to another involves transmitting electromagnetic fields containing time varying information commensurate with an information source. Electromagnetic fields are currently employed in the transmission of radio, television and telecommunications signals from a transmitting site to a receiving site. Systems of this type include generators, antennas and receivers designed to generate and detect electromagnetic (E, B) fields. The relationships between the electric (E) and magnetic (B) fields and the generation of these fields by charge sources ($\rho$) and current sources (J) are governed by Maxwell's equations, namely:

$$\nabla \times E = -\frac{\partial B}{\partial t} \tag{1}$$

$$c^2 \nabla \times B = \frac{J}{\epsilon_o} + \frac{\partial E}{\partial t} \tag{2}$$

$$\nabla \cdot E = \frac{\rho}{\epsilon_o} \tag{3}$$

$$\nabla \cdot B = 0 \tag{4}$$

where
c=the speed of light, and
$\epsilon_o$=permittivity of free space.

These equations, supplemented by boundary conditions, yield the field distributions for given source configurations.

For particular geometries it is often convenient to introduce, as an intermediary in the solution of Maxwell's equations, the potential functions (A, $\phi$) where A is the standard vector potential and $\phi$ the scalar potential. The potentials (A, $\phi$) are related to the fields (E, B) by the defining equations $$B = \nabla \times A \tag{5}$$

$$E = -\nabla \phi - \frac{\partial A}{\partial t} \tag{6}$$

The electric field E thus consists of an electrostatic component, $\nabla \phi$, and an electrodynamic component, $\partial A/\partial t$. Substitution of Equations (5) and (6) into Maxwell's Equations causes Equations (1)–(4) to reduce to $$\nabla^2 \phi - \frac{1}{c^2} \frac{\partial^2 \phi}{\partial t^2} = -\frac{\rho}{\epsilon_o} \tag{7}$$

$$\nabla^2 A - \frac{1}{c^2} \frac{\partial^2 A}{\partial t^2} = -\frac{J}{\epsilon_o c^2} \tag{8}$$

$$\nabla \cdot A - \frac{1}{c^2} \frac{\partial \phi}{\partial t} \tag{9}$$

Equation (7) determines the scalar potential $\phi$ in terms of the charge distribution $\rho$ alone, Equation (8) determines the vector potential A in terms of the current distribution J alone, while Equation (9) is a constraining (Lorentz gauge) condition relating the two potentials. From the standpoint of classical electromagnetic theory, use of either the (E, B) or (A, $\phi$) formulation is a matter of convenience, and they are considered indistinguishable. Neither is considered more fundamental, and both lead to identical predictions with regard to measurable consequences.

With the advent of quantum theory, however, the above picture changed. In the prior art literature the (A, $\phi$) formalism has emerged as more fundamental because it predicts certain quantum interference effects that have been observed and are not apparent from the (E, B) approach. This difference was first set forth in an unequivocal way in a seminal 1959 paper by Aharonov and Bohm, entitled "Significance of Electromagnetic Potentials in the Quantum Theory," *Physical Review* 115, 485 (1959); see also "Further Considerations on Electromagnetic Potentials in the Quantum Theory," *Physical Review* 123, 1511 (1961). In these papers it is shown that in certain two-leg electron-interferometer configurations in which the potentials A and $\phi$ are established in a region of space, but E and B are absent, it is nonetheless possible for the potentials to induce changes in electron quantum interference patterns. That is, electrons that are in an electromagnetic field-free region and therefore do not encounter an electric or magnetic field are nonetheless acted upon by the presence of the A and/or $\phi$ potentials. Such an effect is now referred to broadly as the Aharonov-Bohm effect, and devices have been built which demonstrate this effect in the laboratory; for a recent overview, see Y. Imry and R. A. Webb, "Quantum Interference and the Aharonov-Bohm Effect," *Scientific American* 260, 56 (April 1989).

A second quantum interference effect which demonstrates the independent reality of the (A, $\phi$) potentials in the absence of the (E, B) fields (and one which is significant for the technology disclosed herein) is a single-leg electron-interferometer effect known as the Josephson effect; see R. P. Feynman et al., *The Feynman Lectures on Physics*, vol. III (Addison-Wesley, Reading, Mass., 1965), pp. 21–14 through 21–18. The Josephson effect is based on the fact that the current density J through a Josephson junction (which consists of two superconductors separated by a thin electric insulator) is determined by the magnitude of the potentials A and $\phi$, independent of whether E or B fields are present, in accordance with $$J = J_o \sin\left(\delta_o - \frac{4\pi e}{h} \int A \cdot dr + \frac{4\pi e}{h} \int \phi dt \right) \tag{10}$$

where $\phi$ is the potential difference across the junction, $\int A \cdot dr$ is evaluated across the junction, $\delta_o$ is an arbitrary phase constant $0 \leq \delta_o \leq 2\pi$ and e and h are the electronic charge and Planck's constant, respectively, e=1.602×10$^{-19}$ coulombs, h=6.626×10$^{-34}$ joule-sec. By placing a voltage (V) across such a junction (such a voltage is associated with a constant component of $\phi$), an oscillating Josephson current is induced which leads to Josephson radiation at a frequency of 483.2 MHz/$\mu$V; see B. D. Josephson, *Reviews of Modern Physics* 36, 216 (1964). Such radiation is detectable as disclosed by D. Langenberg, et al., *Physical Review Letters* 15, 294 (1965). If either A or φ from an external source is incident on a Josephson junction, the Josephson radiation is modulated and can be detected. Thus, the Josephson effect and the Aharonov-Bohm effect provide proof of the independent significance of the potentials (A, φ) upon which the communications technology disclosed herein is based.

In the prior art, the Josephson effect has been proposed as a detector of curl-free vector potential A in the absence of magnetic field B (B=∇×A=0) as has been previously disclosed by Gelinas in U.S. Pat. Nos. 4,429,280, 4,429,288, 4,432,098, 4,447,779, 4,491,795, 4,605,897 and an unpublished paper "Curl-Free Vector Potential Effects in a Simply Connected Space," presented at the 1986 International Tesla/IEEE Symposium, Colorado Springs, Colo. Of the above patents, U.S. Pat. No. 4,429,280 is directed to an apparatus for and method of demodulating a modulated curl-free magnetic vector potential field. A Josephson junction responds to the curl-free magnetic vector potential field to generate a signal including a replica of the modulation imposed on the curl free field. The signal from the junction is coupled to a detector for deriving information that is a replica of information transmitted from a source of the curl free field that may be a current driven toroidal or solenoid source.

THE INVENTION

In accordance with one aspect of the present invention, information that changes as a function of time is communicated from a transmitting site to a receiving site by transmitting a signal having scalar and vector potentials that vary as a function of time in accordance with the information. The transmitted signal does not include an electromagnetic field, i.e., the electromagnetic field is suppressed. In the preferred embodiment, the transmitted signal, as received at the receiving site, is detected with a Josephson junction structure that radiates an electromagnetic wave to a receiver in very close proximity to the Josephson junction. The Josephson junction and receiver for the electromagnetic wave are preferably located in a housing that is shielded for electric and magnetic waves, but which permits the scalar and vector potentials to be transmitted through it.

Hence, the communication method and apparatus of the present invention differs from that disclosed by Gelinas because the present invention employs a suppressed electromagnetic field (i.e. E=B=0) and is based on transmission of the vector and scalar potentials only. In the Gelinas device, modulation of the A field for purposes of detection creates a finite non-zero E (i.e., E≠0) field in accordance with $$E = -\frac{\partial A}{\partial t}$$

as indicated by Equation (6).

To enable the vector and scalar potentials to be generated while suppressing the electromagnetic field, devices based on Equations (5) and (6) are constructed, subject to the requirement that E and B are set equal to zero. That is, in these devices current (J) and charge (ρ) distributions are formed in radiators, i.e., antennas, to ensure that in the exterior space of interest $$\nabla \times A = 0 \text{ (i.e., } B = \nabla \times A = 0) \tag{11}$$

and $$\nabla \phi = -\frac{\partial A}{\partial t} \left( \text{i.e., } E = -\nabla\phi - \frac{\partial A}{\partial t} = 0 \right) \tag{12}$$

In other words, the electromagnetic field is suppressed if the magnetic field is null by virtue of the vector potential being curl-free, and if the electrostatic and electrodynamic fields cancel in time and space.

Cancellation of the electric and magnetic fields in a communication link using vector and scalar potentials between a transmission site and a receiving site in parallel planes extending between the sites is achieved, in accordance with a preferred embodiment of the invention, by generating curl-free vector potential, and electrostatic and electrodynamic fields that are opposed to each other in time and space. To this end, an electrostatic field generator is driven by a voltage source to produce an electrostatic field in the planes. The electrostatic field is in opposition to an electrodynamic field produced by a structure driven by a current source which is configured to generate a curl-free vector potential. These structures for producing the curl-free vector potential, and the cancelling electrostatic and electrodynamic fields are driven by time-derivative-related voltage and current sources exciting them. The amplitudes of the voltage and current applied to the structures which derive the curl-free vector potential, and the electrostatic and electrodynamic fields are adjusted to provide cancellation of the electromagnetic field which otherwise would propagate in the planes.

One advantage of the present invention, alluded to before, is that the vector and scalar potentials penetrate electromagnetic shields. This is because electromagnetic shields work on the principle that incident (E, B) fields induce countereffects that cancel said incident fields in the shielding materials. Such shielding effects do not occur for signals based solely on vector and scalar potential concepts, frequently referred to hereafter as (A, φ) signals. Devices based on the (A, φ) concepts are frequently referred to herein as pure-potential devices (PPD's).

A further advantage of the present invention is that prior art electromagnetic receivers do not detect pure-potential signals. The prior art electromagnetic receivers are based on detecting electric and/or magnetic fields, neither of which is present in devices, systems and methods in accordance with the present invention. Hence, the present invention provides an overlapping, parallel use spectrum that exists side by side with the ordinary electromagnetic spectrum. The pure-potential transmission does not interfere with the prior art electromagnetic transmission and vice versa.

It is, accordingly, an object of the present invention to provide a new communication method and apparatus.

Another object of the present invention is to provide an electric communication method and apparatus that does not rely on magnetic, electric, or electromagnetic fields but employs structures resembling those capable of generating magnetic and electric fields.

A further object of the invention is to provide a communication method and apparatus relying on transmission of vector and scalar potentials without the transmission of electromagnetic fields.

Another object of the present invention is to provide a new and improved method of and apparatus for transmitting time-varying information from a site.

An additional object of the present invention is to provide a transmitter of time-varying information, wherein the information is transmitted via vector and scalar potentials, with a suppressed electromagnetic field.

Still another object of the present invention is to provide a receiver that is shielded from electromagnetic, electric and magnetic signals, but which is capable of receiving signals consisting of vector and scalar potentials.

Still a further object of the invention is to provide a new and improved structure for radiating a vector and scalar signal without radiating an electromagnetic signal.

In one of the preferred embodiments of the invention, the pure potential $(A, \phi)$ signal has variations at a sufficiently low frequency as to enable quasi-static conditions to be established, as occurs for $$\frac{\partial^2}{\partial t^2} \ll \nabla^2, \text{ i.e., } \frac{\partial^2 A}{\partial t^2} \ll \nabla^2 A, \frac{\partial^2 \phi}{\partial t^2} \ll \nabla^2 \phi.$$

For the quasi-static situation, the $(A, \phi)$ signal propagates in a near field without an electromagnetic component in certain parallel planes.

The above and still further objects, features and advantages of the present invention will become apparent upon consideration of the following detailed description of several specific embodiments thereof, especially when taken in conjunction with the accompanying drawings.

DESCRIPTION OF THE PREFERRED EMBODIMENT

Figure 1:
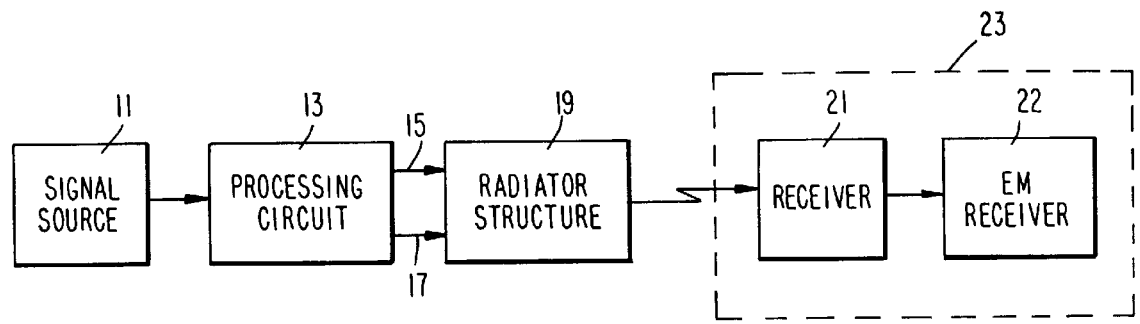
FIG. 1 is a block diagram of a communications system in accordance with a preferred embodiment of the present invention.

Reference is now made to FIG. 1 of the drawing wherein there is illustrated a time-varying signal source 11, such as an analog voice source. Signal source 11 drives processing circuit 13 to cause the circuit to derive a pair of time-derivative-related signals (one being effectively the time derivative of the other) on leads 15 and 17. The time-derivative-related signals on leads 15 and 17 are applied to radiator structure 19 which causes a vector and scalar potential signal $(A, \phi)$ containing the information of signal source 11 to be transmitted.

The signal transmitted from radiator structure 19 has a suppressed, i.e., zero, electromagnetic field in certain parallel planes extending between radiator structure 19 and receiver structure 21. The $(A, \phi)$ signal radiates in the parallel planes in which the electromagnetic field is suppressed between radiator structure 19 and receiver 21. Vector and scalar potentials of the $(A, \phi)$ signal vary as a function of the variations of signal source 11. To suppress the electromagnetic field, radiator structure 19 produces a curl-free vector potential, as well as electrostatic and electrodynamic fields that are in opposition to each other in time and space. In addition, the relative amplitudes of the signals on leads 15 and 17 are properly adjusted by processing circuit 13 to suppress the electromagnetic field (E, B) in these parallel planes. The vector potential and electrostatic field generating structures in radiator structure 19 are driven by time-derivative-related current and voltage sources that are responsive to the signal of source 11.

If the vector and scalar potentials vary slowly in time such that they are considered quasi-static, i.e., $$\partial^2/\partial t^2 \ll \nabla^2, \tag{11}$$

Equations (5)–(9) reduce to $$\nabla \times A = 0, \nabla \phi = -\frac{\partial A}{\partial t}, \nabla^2 \phi = 0. \tag{12}$$

To achieve these results radiator structure 19 is excited by the signals on leads 15 and 17 to enable (a) a curl-free vector potential $(\nabla \times A=0)$ to be derived and (b) electric field effects associated with the scalar and vector potentials to cancel, i.e., $$\nabla \phi = -\frac{\partial A}{\partial t};$$

this loosely implies that the electrostatic and electrodynamic field effects derived from the radiator structure cancel. A pair of radiator structures which generate potential distributions satisfying these requirements are described infra. These radiator structures transmit quasi-static suppressed electromagnetic signals having vector and scalar potentials $(A, \phi)$.

Receiver 21 is a quantum interference receiver of the Josephson junction type. The receiver is preferably located in shield 23 for electromagnetic, magnetic and electrostatic fields; shield 23 includes, for example, a mu metal screen superposed with a copper or aluminum screen. The shield is pervious to the vector and scalar potential $(A, \phi)$ signal.

Receiver 21 includes, in the preferred embodiment, a thin dielectric sheet sandwiched between a pair of superconductors in an appropriate cryogenic environment. The superconductors are biased by a DC source so that the Josephson junction of quantum interference receiver 21 normally radiates electromagnetic energy at a predetermined radio frequency. In response to the $(A, \phi)$ wave from radiator structure 19 penetrating the magnetic and electrostatic shield 23 surrounding quantum interference receiver 21 and being incident on the Josephson junction, the radio frequency radiation emitted by the Josephson junction is modulated. The modulation is a replica of the variations of the $(A, \phi)$ wave incident on the Josephson junction. The modulated radiation from the Josephson junction is coupled, basically as an electromagnetic wave, to conventional electromagnetic wave radio receiver 22, also located within shield 23 so that the electromagnetic wave is not radiated outside of the shield. Receiver 22 is connected by a cable (not shown) to processing circuitry that is either inside or external to shield 23.

Figure 2:
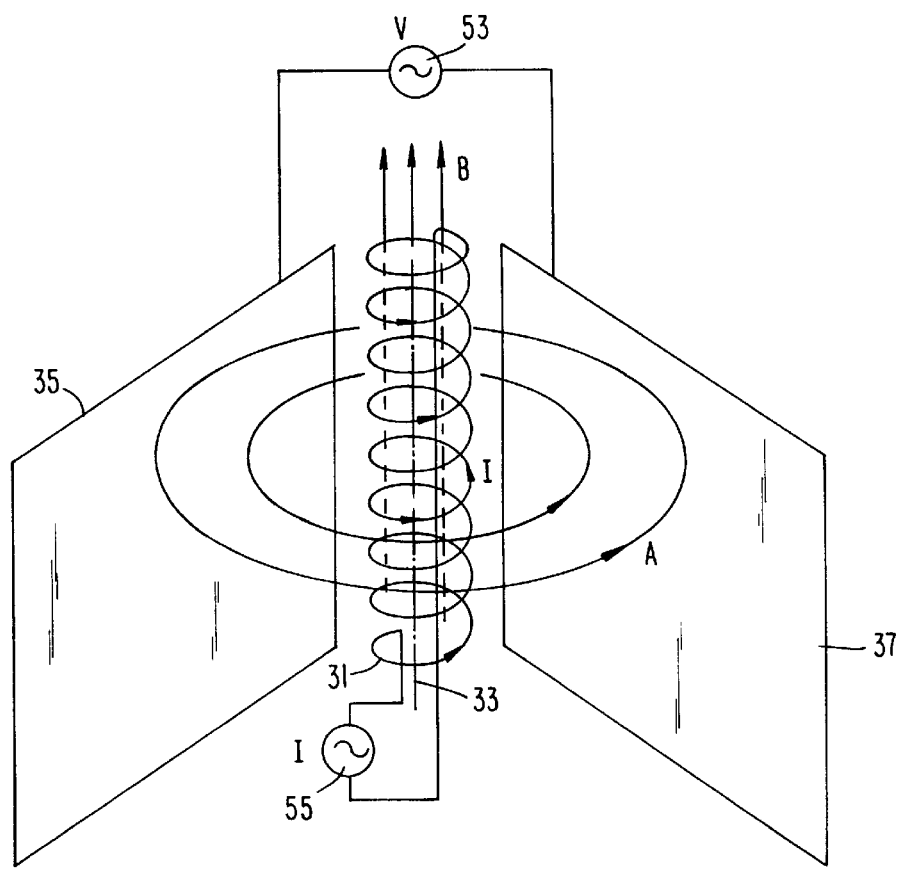
FIG. 2 is a perspective view of one embodiment of a radiator structure including a pair of metal plates and a solenoid that can be employed in the system of FIG. 1 to provide a quasi-stationary near field $(A, \phi)$ communication link.
Figure 3:
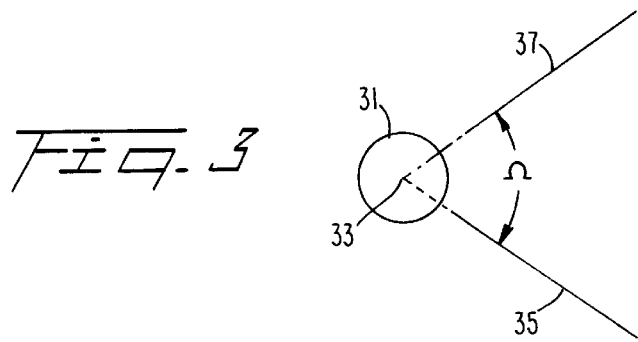
FIG. 3 is a top view of the radiator structure illustrated in FIG. 2.

Reference is now made to FIGS. 2 and 3 of the drawing wherein there is illustrated one preferred embodiment of radiator structure 19 for deriving a near field, quasi-static $(A,$ φ) suppressed electromagnetic signal that radiates from the transmitter to receiver 21 in horizontal planes. The structure of FIGS. 2 and 3 includes solenoid coil 31 (positioned so axis 33 thereof extends vertically) in combination with planar non-magnetic metal panels 35 and 37 that extend in the vertical plane. Panels 35 and 37 can be configured as plates or screens; hereafter they are generally referred to as plates. Plates 37 and 39 are arranged so that projections of the planes thereof intersect axis 33. The angular separation between plates 37 and 39 determines the gain and directivity of the (A, φ) signal derived from structure 19.

Solenoid 31 is driven by current source 55 to produce a vertically directed magnetic field (B) within the solenoid and a curl-free vector potential exterior to the solenoid. Plates 35 and 37 are driven by voltage source 53 to produce an electrostatic field in the horizontal plane. The voltage applied to plates 35 and 37 varies as the time derivative of the current applied to solenoid 31. The amplitudes of the current driving solenoid 31 and the voltage driving plates 35 and 37 are adjusted so that a curl-free vector potential is generated, and the electrostatic and electrodynamic fields from the solenoid and plates cancel in the horizontal planes in the near field which causes the electromagnetic field to be suppressed in the horizontal planes. The fields from solenoid 31 and plates 35 and 37, however, combine in the horizontal planes to produce modulated vector and scalar potentials (A, φ) that cause a signal to be transmitted in the horizontal plane from the solenoid and plates to receiver 21. The magnetic field (B) in solenoid 31 is given by $$B = 1_z \mu_O \left( \frac{N}{d} \right) I(t)$$

where:

$1_z$=the unit vector in the vertical (z) direction $\mu_o$=magnetic permeability of free space ($4\pi \times 10^{-7}$ HM$^{-1}$)

I(t)=current flowing in the solenoid

N/d=number of turns per unit length.

Associated with the magnetic field B trapped in solenoid 31 is the potential vector (A), which is given by $$A = 1_\theta \mu_O \left( \frac{N}{d} \right) \frac{a^2}{2r} I(t)$$

where:

$1_\theta$=the unit angular vector in a plane at right angles to axis 33 of solenoid 31 a=the radius of solenoid 31 from axis 33 r=the distance of vector potential field line (A) from axis 33.

The scalar potential φ in the horizontal plane at an angle θ from one of plates 35 or 37 is given by $$\phi = -\frac{V(t)}{\Omega} \theta$$

where:

V(t)=voltage between plates 35 and 37

Ω=total angular separation between plates 35 and 37.

Because the magnetic field B produced by solenoid 31 is confined to the interior of the solenoid, the curl-free vector potential A is incident on receiver 21. If cosine and sine waves $V_m \cos \omega t$ and $I_m \sin \omega t$ are supplied to leads 15 and 17, the electrostatic field from plates 35 and 37 and the electrodynamic field from coil 31 can be adjusted to cancel and thereby suppress the E-field between the plates if:

$$E = -\nabla \phi - \frac{\partial A}{\partial t} =$$

$$1_\theta \left[ \frac{V_m \cos \omega t}{\Omega r} - \mu_O \left( \frac{N}{d} \right) \frac{a^2}{2r} \frac{\partial (I_m \sin \omega t)}{\partial t} \right] = 0$$

where:

ω=2πf f=frequency of the voltage applied to plates 35 and 37 and of the current applied to coil 31.

While the radiator structure of FIGS. 2 and 3 has been illustrated and described as transmitting the (A, φ) signal with a suppressed electromagnetic field in horizontally extending planes, it is to be understood that the radiator structure could be designed to transmit the (A, φ) signal in mutually parallel planes at any inclination; the propagation planes are at right angles to axis 33 of solenoid 31. The radiator structure is arranged so plates 35 and 37 and axis 33 all lie in planes that are at right angles to a common plane in which the (A, φ) signal is transmitted.

Figure 4:
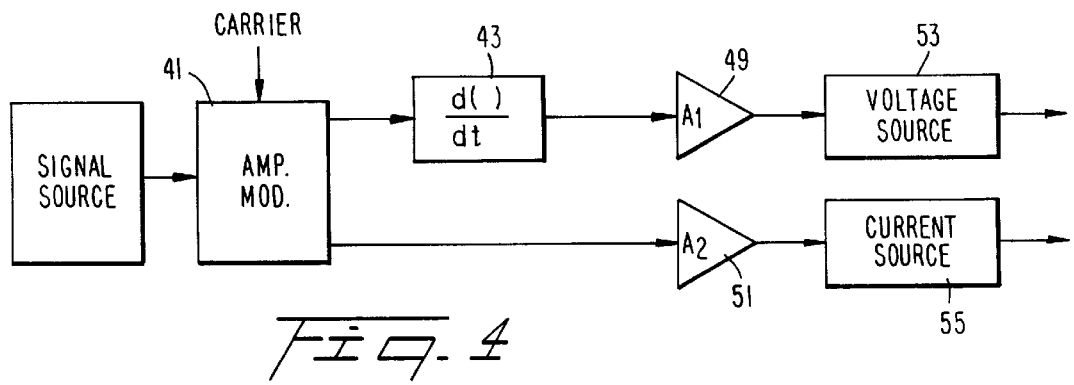
FIG. 4 is a schematic diagram of processing circuitry included in an amplitude modulated transmitter in the system of FIG. 1.

One embodiment of processing circuit 13 for enabling amplitude modulated time varying vector and scalar potentials (A, φ) to be transmitted from radiator structure 19 to receiver 21 is illustrated in FIG. 4. In FIG. 4, signal source 11 is an audio frequency source, such as a voice source having multiple frequencies. The signal from source 11 is supplied to amplitude modulator 41, driven by a carrier having a frequency sufficiently low to enable the quasi-static conditions to be met. (In an actual experiment, it was found that the quasi-static conditions can be met easily for frequencies equal at least to 1.5 MHz.) The amplitude modulated output signal of modulator 41 is applied in parallel to differentiator 43 and amplifier 51, having a gain $A_2$. Differentiator 43 has an output that is supplied to amplifier 49, having a gain $A_1$. The output signals of amplifiers 49 and 51 are thereby time-derivative-related. The values of $A_1$ and $A_2$ are adjusted to enable the near electromagnetic field from radiator structure 19 to be suppressed in the horizontal planes. The signals derived from amplifiers 49 and 51 are respectively applied to voltage source 53 and current source 55. Sources 53 and 55 are two terminal output devices, with the voltage developed by source 53 being applied to plates 35 and 37 and the current derived from source 55 being applied to solenoid 31.

Figure 5:
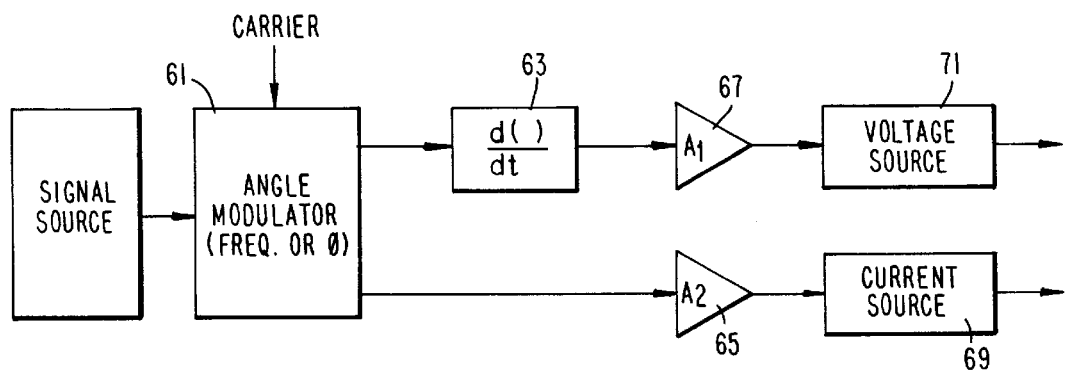
FIG. 5 is a block diagram of processing circuitry included in an angle modulated transmitter in the system of FIG. 1.

Reference is now made to FIG. 5, a block diagram of processing circuitry 13 for enabling an electromagnetic suppressed, pure potential (A, φ) signal to be transmitted as an angle modulated wave from radiator structure 19 to receiver 21. Signal source 11 may be a relatively low variable frequency source, such as a speech source. The output of source 11 is applied to angle modulator 61, which can be either a frequency or phase modulator, also responsive to a carrier wave having a frequency sufficiently low to enable the quasi-static conditions associated with the radiator of FIGS. 2 and 3 to be achieved. Modulator 61 derives an FM or PM output that is applied in parallel to differentiator 63 and amplifier 65, having a gain $A_2$. Differentiator 63 has an output that is supplied to amplifier 67, having a gain $A_1$. The output signals of amplifiers 65 and 67 are thereby time-derivative-related; the values of $A_1$ and $A_2$ cause the amplitude of the electromagnetic signal derived from radiator structure 19 to be suppressed. The output signals of amplifiers 65 and 67 are respectively supplied to current source 69 and voltage source 71 which drive solenoid 31 and plates 35, 37 of radiator structure 19 in the same manner described supra with regard to voltage and current sources 53 and 55.

Figure 6:
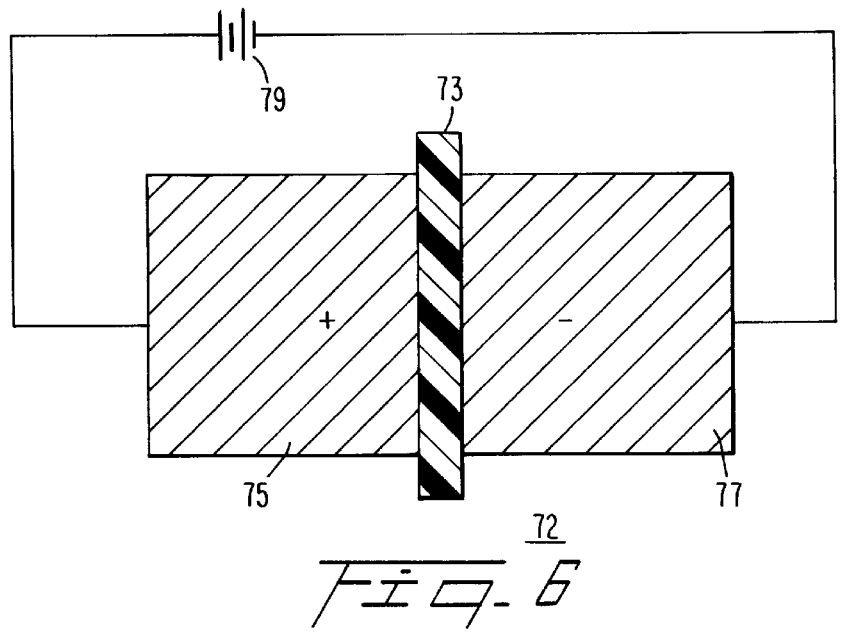
FIG. 6 is a schematic diagram of a receiver employed in the system of FIG. 1.

Reference is now made to FIG. 6 of the drawing, a schematic diagram of the apparatus preferably included in receiver 21. As indicated supra, receiver 21 is a quantum interference receiver including Josephson junction 72, formed of horizontally disposed thin electric insulator 73, sandwiched between opposed planar end faces of Type I superconductor rods 75 and 77. Josephson junction structure 72 is located in an appropriate cryogenic environment, as well known to those skilled in the art. DC voltage source 79 has opposite electrodes connected to superconductors 75 and 77. In response to no signal energy being incident on Josephson junction 72, electromagnetic radiation having a predetermined frequency, governed by the amplitude of the voltage applied by source 79 to the junction, is radiated from the junction. The amplitude and frequency of the electromagnetic radiation radiated by Josephson junction 72 are modulated by the (A, φ) signal incident on the junction, as radiated from radiator structure 19 and received by receiver 21, after propagating through magnetic and electric shield 23. The amplitude and frequency of the modulated radiation emitted by the Josephson junction are coupled to and received by electromagnetic receiver 22, located in shield 23.

Figure 7:
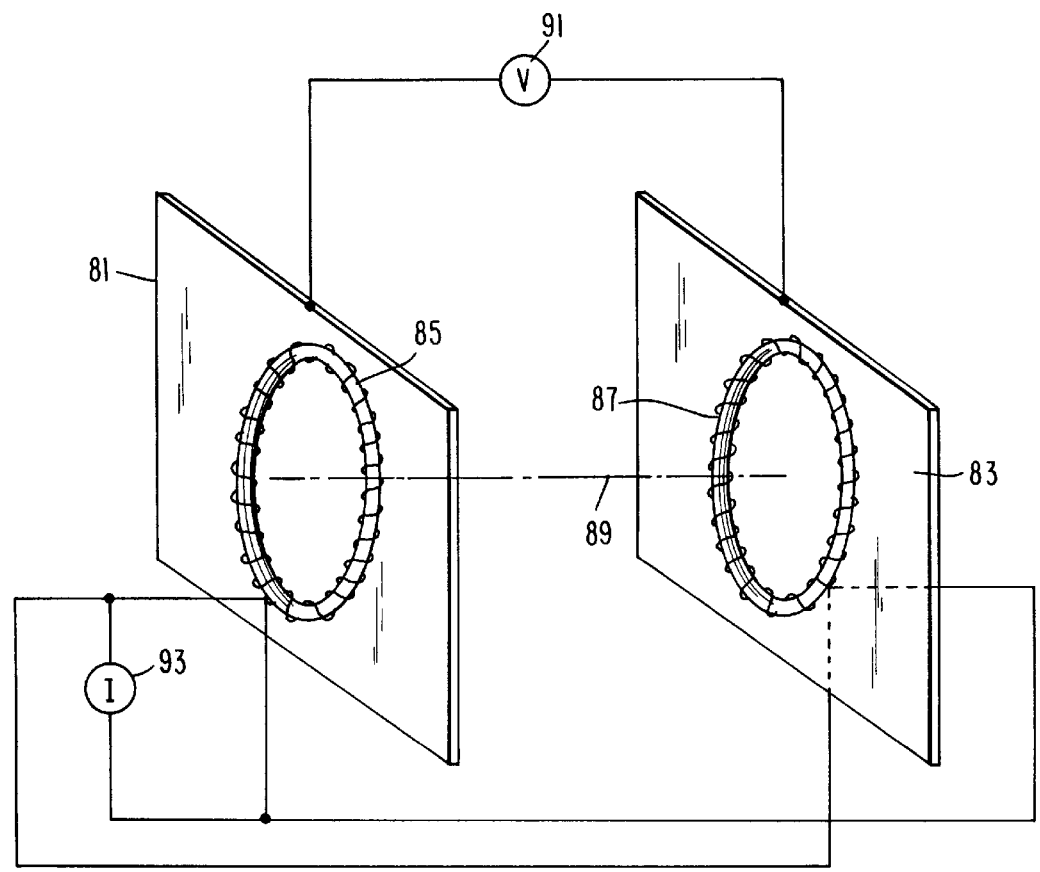
FIG. 7 is a perspective view of an embodiment of the radiator structure illustrated in FIG. 1 wherein a pair of toroid vector potential generators and metal panels are employed to generate a quasi-stationary near field $(A, \phi)$ signal.

A further embodiment of a near field radiator structure for a quasi-static vector and scalar potential (A, φ) signal with suppressed electromagnetic energy in horizontal planes is illustrated in FIG. 7 as including metal screens 81 and 83 and toroidal coils 85 and 87, all of which are arranged so they extend parallel to each other in mutual parallel vertical planes. Screens 81 and 83 are respectively in close proximity to coils 85 and 87. Coils 85 and 87 have a common axis 89, extending in the horizontal plane. Hence, the magnetic fields that circulate within toroidal coils 85 and 87 are at right angles to the electric field established between screens 81 and 83 so that the vector potential and electrodynamic fields derived from the toroidal coils and the electric fields derived from the screens can, if properly phased and adjusted to the correct amplitude, interact to produce time varying vector and scalar potential (A, φ) signals without producing an electromagnetic field.

Screens 81 and 83 are driven by voltage source 91, while toroidal coils 85 and 87 are driven in parallel by current source 93. The voltage and current applied by sources 91 and 93 to screens 81 and 83 and to toroidal coils 85 and 87 are time-derivative phased and adjusted in amplitude, as described supra, to provide a time varying (A, φ) signal having no electromagnetic component in the same planes as the (A, φ) signal radiates.

While there have been described and illustrated specific embodiments of the invention, it will be clear that variations in the details of the embodiments specifically illustrated and described may be made without departing from the true spirit and scope of the invention as defined in the appended claims. For example, the invention is not limited to near field devices, but is also applicable to far field, radiation transmission devices wherein the quasi-static conditions need not subsist. To this end, the antennas are structured and driven to generate field distributions that satisfy the pure-potential requirement established in Equations (11) and (12). Also, it is not necessary for the radiators to be driven by sine waves that, in order to meet the time-derivative-relation requirement, are quadrature phased. If the signal source is, for example, a triangular wave, the time-derivative relationship is derived by differentiating the triangular wave into a square wave such that the square and triangular waves are respectively supplied by the voltage and current sources to the panel and coil arrangements.

I claim:

1. A method of communicating information that changes as a function of time from a first site to a second site comprising transmitting a signal that varies as a function of time in accordance with the information from the first site to the second site, the signal having scalar and vector potentials without including an electromagnetic field, receiving the transmitted signal at the second site, and detecting the information from the signal as received at the second site.

2. The method of claim 1 wherein the signal is generated by deriving a curl-free vector potential, and electrostatic and electrodynamic fields that are mutually opposed in time and space and which vary as a function of time in accordance with the information and have amplitudes to cause the derived electrostatic and electrodynamic fields to cancel.

3. The method of claim 2 wherein the curl-free vector potential, and the cancelling electrostatic and electrodynamic fields are derived from electrostatic and vector potential generating structures respectively driven by voltage and current sources deriving controlled phased outputs which suppress electromagnetic fields but retain scalar and vector potentials which vary as a function of time in accordance with the information.

4. The method of claim 2 wherein the curl-free vector potential, and the cancelling electrostatic and electrodynamic fields are derived from electrostatic and vector potential generating structures respectively driven by voltage and current sources deriving first and second outputs such that one of the outputs is the time derivative of the other output.

5. The method of claim 1 wherein the signal is received at the second site by a quantum interference receiver.

6. The method of claim 5 wherein the quantum interference receiver is in a shield for magnetic and electric energy but which is pervious to scalar and vector potentials.

7. The method of claim 1 wherein the signal is a near field signal and the second site is in the near field of radiation from the first site.

8. The method of claim 7 wherein the information is at a frequency causing the transmitted signal to be quasi-static.

9. The method of claim 1 wherein the information is at a frequency causing the transmitted signal to be quasi static.

10. The method of claim 9 wherein the signal is amplitude modulated as a function of time in response to the information.

11. The method of claim 9 wherein the signal is angle modulated as a function of time in response to the information.

12. The method of claim 1 wherein the signal is amplitude modulated as a function of time in response to the information.

13. The method of claim 1 wherein the signal is angle modulated as a function of time in response to the information.

14. A method of transmitting information that changes as a function of time comprising transmitting a signal having scalar and vector potentials without including an electromagnetic field, the signal varying as a function of time in accordance with the information.

15. The method of claim 14 wherein the signal is generated by deriving curl-free vector potentials and electrostatic and electrodynamic fields that are mutually opposed in time and space and which vary as a function of time in accordance with the information and have amplitudes to cause the derived electrostatic and electrodynamic fields to cancel.

16. The method of claim 15 wherein the curl-free vector potential, and the electrostatic and electrodynamic fields are derived from scalar and vector potential generating structures respectively driven by voltage and current sources deriving selectively phased outputs which suppress electromagnetic fields but retain scalar and vector potentials which vary as a function of time in response to the information.

17. The method of claim 15 wherein the curl-free vector potential, and the cancelling electrostatic and electrodynamic fields are derived from electrostatic and vector potential generating structures respectively driven by voltage and current sources deriving controlled phased outputs which suppress electromagnetic fields but retain scalar and vector potentials which vary as a function of time in accordance with the information.

18. The method of claim 14 wherein the signal is a near field wave.

19. The method of claim 18 wherein the information is at a frequency causing the transmitted signal to be quasi-static.

20. The method of claim 14 wherein the information is at a frequency causing the transmitted signal to be quasi-static.

21. The method of claim 20 wherein the signal is amplitude modulated as a function of time in response to the information.

22. The method of claim 20 wherein the signal is angle modulated as a function of time in response to the information.

23. The method of claim 14 wherein the signal is amplitude modulated as a function of time in response to the information.

24. The method of claim 14 wherein the signal is angle modulated as a function of time in response to the information.

25. A communication transmitter comprising a source of a time varying input signal, and means responsive to the signal for deriving a transmitted signal having scalar and vector potentials without including an electromagnetic field, the transmitted signal varying as a function of time in accordance with the input signal.

26. The communication transmitter of claim 25 wherein the means for deriving the transmitted signal includes means for deriving a curl-free vector potential, and electrostatic and electrodynamic fields that are mutually opposed in time and space and which vary as a function of time in accordance with the input signal and have amplitudes to cause the derived electrostatic and electrodynamic fields to cancel.

27. The communication transmitter of claim 26 wherein the means for deriving the transmitted signal further includes electrostatic and vector potential generating structures, a voltage source connected to drive the electrostatic field generating structure, a current source connected to the vector potential generating structure, the current and voltage sources being connected to be responsive to the input signal and arranged to supply time-derivative-related currents and voltages to the vector potential and electrostatic field generating structures.

28. The communication transmitter of claim 27 wherein the electrostatic field generating structure includes a pair of spaced metal planar panels extending in the same directions, the vector potential generating structure including at least one coil.

29. The communication transmitter of claim 28 wherein projections of the panels intersect on a line, the coil being a solenoid having an axis coincident with the line.

30. The communication transmitter of claim 28 wherein the coil is a toroid having an axis at right angles to the planes of the panels.

31. The communication transmitter of claim 30 wherein the panels are in mutually parallel planes.

32. The communication transmitter of claim 28 wherein a pair of the coils is provided, each of the coils being a toroid, both toroids having a common axis at right angles to the planes of the panels.

33. The communication transmitter of claim 32 wherein the panels are in mutually parallel planes.

34. A communication transmitter comprising a source of a time varying input signal, and means responsive to the signal for deriving a transmitted signal, the transmitted signal deriving means including means for deriving a curl-free vector potential, and electrostatic and electrodynamic fields that are mutually opposed in time and space and which vary as a function of time in accordance with the input signal.

35. The communication transmitter of claim 34 wherein the amplitudes of the electrostatic and electrodynamic fields are such as to cause the derived electrostatic and electrodynamic fields to cancel.

36. The communication transmitter of claim 34 wherein the means for deriving the transmitted signal further includes electrostatic and vector potential generating structures, a voltage source connected to drive the electrostatic field generating structure, a current source connected to drive the vector potential generating structure, the current and voltage sources being connected to be responsive to the input signal and arranged to supply time-derivative-related currents and voltages to the vector potential and electrostatic field generating structures.

37. The communication transmitter of claim 36 wherein the electrostatic field generating structure includes a pair of spaced metal planar panels extending in the same directions, the vector potential generating structure including at least one coil.

38. The communication transmitter of claim 37 wherein projections of the panels intersect on a line, the coil being a solenoid having an axis coincident with the line.

39. The communication transmitter of claim 37 wherein the coil is a toroid having an axis at right angles to the planes of the panels.

40. The communication transmitter of claim 39 wherein the panels are in mutually parallel planes.

41. The communication transmitter of claim 37 wherein a pair of the coils is provided, each of the coils being a toroid, both toroids having a common axis at right angles to the planes of the panels.

42. The communication transmitter of claim 41 wherein the panels are in mutually parallel planes.

43. A signal deriving structure comprising an electrostatic field generating structure, a vector potential generating structure, the field generating structures being arranged to derive a curl-free vector potential, and electrostatic and electrodynamic fields that are mutually opposed in time and space and which vary as a function of time in accordance with information from an input signal source, the amplitudes of the electrostatic and electrodynamic fields being such as to cause the derived electrostatic and electrodynamic fields to cancel.

44. The structure of claim 43 further including a voltage source connected to drive the electrostatic field generating structure, a current source connected to drive the vector potential generating structure, the current and voltage sources being connected to be responsive to the input signal source and arranged to supply mutually time-derivative-related currents and voltages to the vector potential and electrostatic field generating structures.

45. The structure of claim 44 wherein the electrostatic field generating structure includes a pair of spaced metal planar panels extending in the same directions, the vector potential generating structure including at least one coil.

46. The structure of claim 45 wherein projections of the panels intersect on a line, the coil being a solenoid having an axis coincident with the line.

47. The structure of claim 45 wherein the coil is a toroid having an axis at right angles to the planes of the panels.

48. The structure of claim 47 wherein the panels are in mutually parallel planes.

49. The structure of claim 45 wherein a pair of the coils is provided, each of the coils being a toroid, both toroids having a common axis at right angles to the planes of the panels.

50. The structure of claim 49 wherein the panels are in mutually parallel planes.

51. The structure of claim 43 wherein the electrostatic field generating structure includes a pair of spaced metal planar panels extending in the same directions, the vector potential generating structure including at least one coil.

52. The structure of claim 51 wherein projections of the panels intersect on a line, the coil being a solenoid having an axis coincident with the line.

53. The structure of claim 51 wherein the coil is a toroid having an axis at right angles to the planes of the panels.

54. The structure of claim 53 wherein the panels are in mutually parallel planes.

55. The structure of claim 52 wherein a pair of the coils is provided, each of the coils being a toroid, both toroids having a common axis at right angles to the planes of the panels.

56. The structure of claim 55 wherein the panels are in mutually parallel planes.

57. In combination, a quantum interference receiving structure for a scalar and vector potential signal, and a shield for electromagnetic waves enclosing said receiving structure, the shield being permeable to said scalar and vector potential signal.

58. The combination of claim 57 wherein the receiving structure includes a biased Josephson junction on which the scalar and vector potential signal is incident.

59. The combination of claim 57 wherein the receiving structure includes a Josephson junction on which the scalar and vector potential signal is incident, means for biasing the junction to cause the junction to emit electromagnetic radiation, variations of the scalar and vector potential signal incident on the junction causing modulation of the emitted electromagnetic radiation, and a receiver responsive to the emitted electromagnetic radiation, the receiver being enclosed by the shield.

* * * * *